US008918872B2

United States Patent
Kumar et al.

(10) Patent No.: US 8,918,872 B2
(45) Date of Patent: Dec. 23, 2014

(54) SYSTEM, METHOD, AND COMPUTER PROGRAM PRODUCT FOR REACTING IN RESPONSE TO A DETECTION OF AN ATTEMPT TO STORE A CONFIGURATION FILE AND AN EXECUTABLE FILE ON A REMOVABLE DEVICE

(75) Inventors: Lokesh Kumar, Chennai (IN); Harinath V. Ramachetty, Bangalore (IN)

(73) Assignee: McAfee, Inc., Santa Clara, CA (US)

( * ) Notice: Subject to any disclaimer, the term of this patent is extended or adjusted under 35 U.S.C. 154(b) by 902 days.

(21) Appl. No.: 12/163,417

(22) Filed: Jun. 27, 2008

(65) Prior Publication Data

US 2013/0247189 A1 Sep. 19, 2013

(51) Int. Cl.
*G06F 11/00* (2006.01)

(52) U.S. Cl.
USPC ...... 726/23; 726/9; 726/24; 726/27; 717/168; 705/76; 705/325; 709/217; 711/112; 711/115; 711/103

(58) Field of Classification Search
USPC ............... 726/23, 24, 27, 9; 705/325, 76; 717/168; 709/217; 711/112, 115, 103
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 7,058,696 | B1 * | 6/2006 | Phillips et al. ............... 709/217 |
| 7,506,155 | B1 | 3/2009 | Stewart et al. |
| 2004/0073810 | A1 * | 4/2004 | Dettinger et al. ............. 713/201 |
| 2004/0210891 | A1 * | 10/2004 | Kouznetsov et al. ......... 717/168 |
| 2005/0015540 | A1 * | 1/2005 | Tsai et al. ...................... 711/103 |
| 2005/0065678 | A1 * | 3/2005 | Smith et al. ..................... 701/29 |
| 2006/0265340 | A1 * | 11/2006 | Ziv et al. ......................... 705/76 |
| 2007/0038677 | A1 * | 2/2007 | Reasor et al. ................. 707/200 |
| 2007/0143851 | A1 * | 6/2007 | Nicodemus et al. ............ 726/25 |
| 2008/0003997 | A1 * | 1/2008 | Parkkinen et al. ............. 455/421 |
| 2008/0046990 | A1 * | 2/2008 | Narayanaswami et al. ....... 726/9 |
| 2008/0083037 | A1 * | 4/2008 | Kruse et al. ..................... 726/27 |
| 2008/0098172 | A1 * | 4/2008 | Tsang et al. .................. 711/115 |
| 2008/0126831 | A1 * | 5/2008 | Downey et al. ................... 714/4 |
| 2008/0155216 | A1 * | 6/2008 | Shoham ........................ 711/162 |
| 2008/0256076 | A1 * | 10/2008 | Claus et al. ........................ 707/9 |
| 2008/0263245 | A1 * | 10/2008 | Hsieh ............................. 710/106 |
| 2009/0098527 | A1 * | 4/2009 | Fischer et al. ..................... 435/5 |
| 2009/0165136 | A1 * | 6/2009 | Obrecht et al. ................. 726/24 |
| 2009/0217382 | A1 * | 8/2009 | Lecheler ......................... 726/26 |
| 2011/0178942 | A1 * | 7/2011 | Watters et al. ................ 705/325 |

* cited by examiner

*Primary Examiner* — Beemnet Dada
*Assistant Examiner* — Sayed Beheshti Shirazi
(74) *Attorney, Agent, or Firm* — Patent Capital Group

(57) ABSTRACT

A system, method, and computer program product are provided for reacting in response to a detection of an attempt to store a configuration file and an executable file on a removable device. In use, a first device removably coupled to a second device is identified. Additionally, an attempt to store on the first device a configuration file for the first device and an executable file is detected. Further, a reaction is performed in response to the detection of the attempt.

14 Claims, 6 Drawing Sheets

SYSTEM, METHOD, AND COMPUTER PROGRAM PRODUCT FOR REACTING IN RESPONSE TO A DETECTION OF AN ATTEMPT TO STORE A CONFIGURATION FILE AND AN EXECUTABLE FILE ON A REMOVABLE DEVICE

FIELD OF THE INVENTION

The present invention relates to security systems, and more particularly to security of removable devices.

BACKGROUND

The use of removable storage media in computing systems has become widespread. For example, universal serial bus (USB) flash drives have become commonplace as a result of their small size, large storage capacity, and rapid data transfer speeds. However, traditional techniques utilized for ensuring the security of such removable storage media have generally exhibited various limitations.

For example, malware that is contained within an infected computing system and that is not recognized by existing security software present on the infected computing system may detect the presence of removable storage media coupled to the infected computing, and may transfer one or more files infected with malware to the removable storage media without alerting the security software or a user. As a result, when the removable storage media is removed and later connected to a clean computing system, one or more of the infected files may be automatically run and/or transferred to the clean computing system from the removable storage media, thereby infecting the clean computing system and propagating the malware.

Conventional security techniques have traditionally attempted to prevent propagation of malware via removable storage media by disabling functionality of the removable storage media, disabling access to the removable storage media, and/or allowing access to the removable storage media only to select users. Such techniques, however, have greatly limited the functionality and use of removable storage media.

There is thus a need for addressing these and/or other issues associated with the prior art.

SUMMARY

A system, method, and computer program product are provided for reacting in response to a detection of an attempt to store a configuration file and an executable file on a removable device. In use, a first device removably coupled to a second device is identified. Additionally, an attempt to store on the first device a configuration file for the first device and an executable file is detected. Further, a reaction is performed in response to the detection of the attempt.

DETAILED DESCRIPTION

Figure 1:
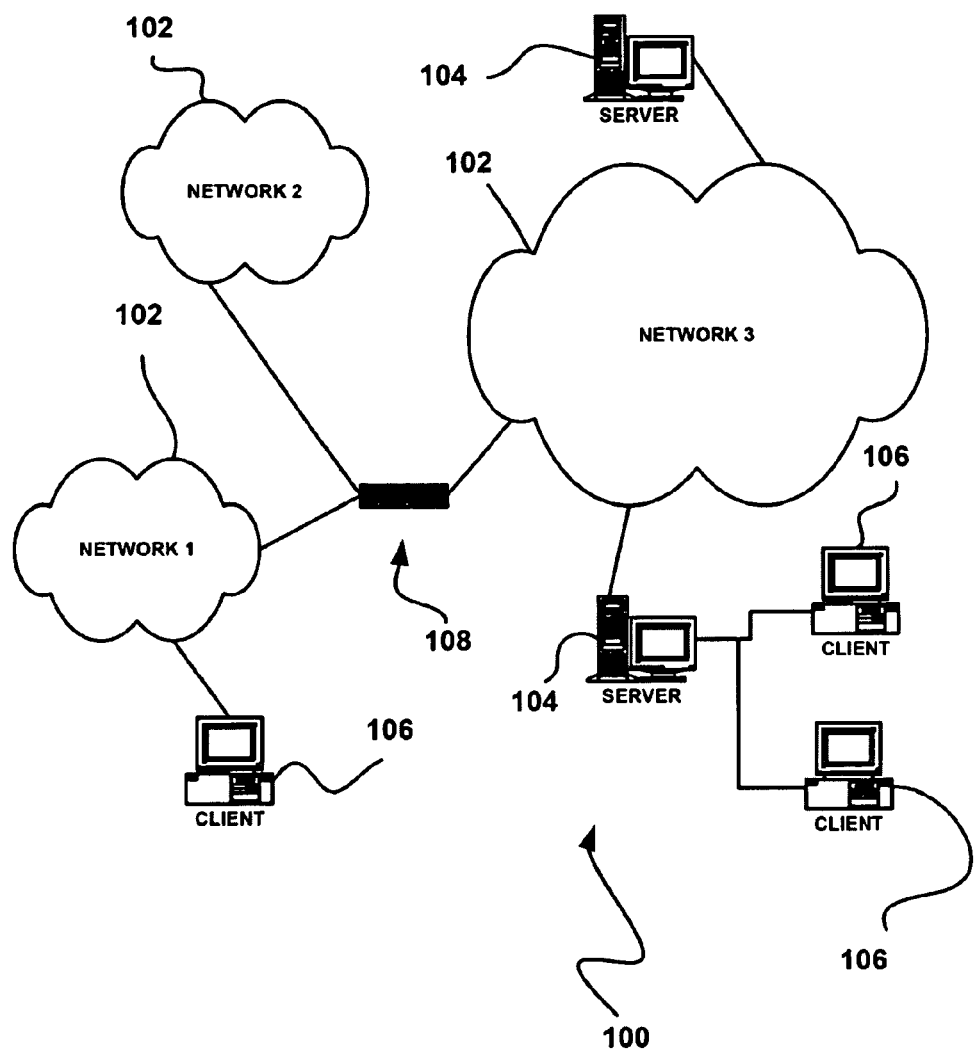
FIG. 1 illustrates a network architecture, in accordance with one embodiment.

FIG. 1 illustrates a network architecture 100, in accordance with one embodiment. As shown, a plurality of networks 102 is provided. In the context of the present network architecture 100, the networks 102 may each take any form including, but not limited to a local area network (LAN), a wireless network, a wide area network (WAN) such as the Internet, peer-to-peer network, etc.

Coupled to the networks 102 are servers 104 which are capable of communicating over the networks 102. Also coupled to the networks 102 and the servers 104 is a plurality of clients 106. Such servers 104 and/or clients 106 may each include a desktop computer, lap-top computer, hand-held computer, mobile phone, personal digital assistant (PDA), peripheral (e.g. printer, etc.), any component of a computer, and/or any other type of logic. In order to facilitate communication among the networks 102, at least one gateway 108 is optionally coupled therebetween.

Figure 2:
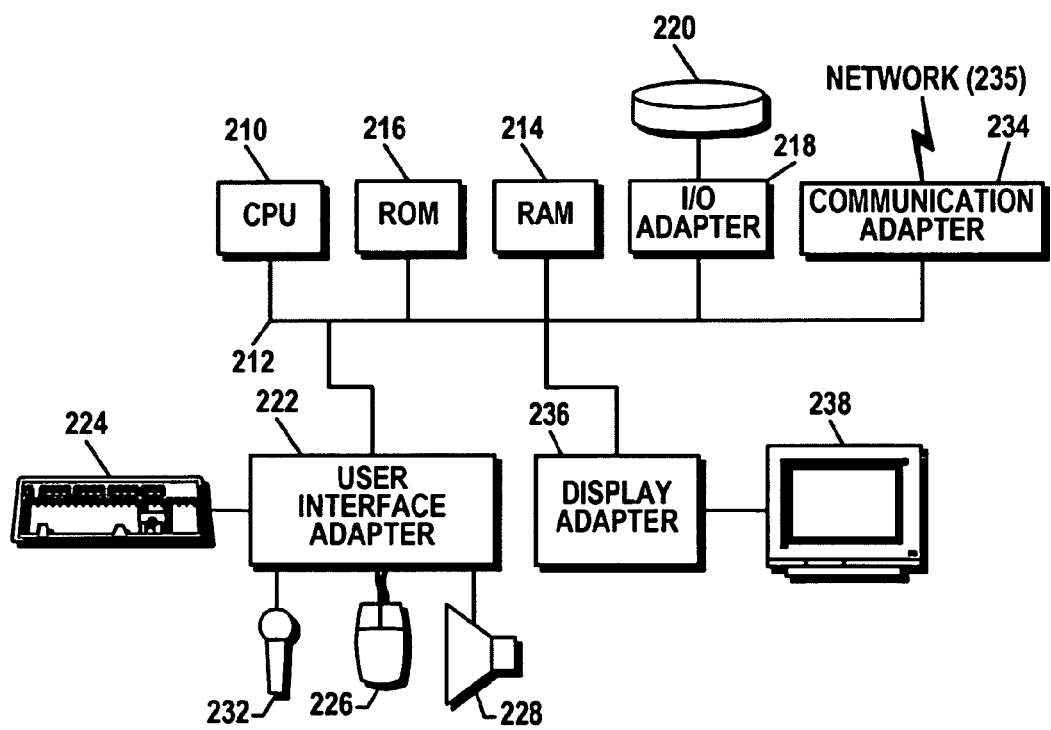
FIG. 2 shows a representative hardware environment that may be associated with the servers and/or clients of FIG. 1, in accordance with one embodiment.

FIG. 2 shows a representative hardware environment that may be associated with the servers 104 and/or clients 106 of FIG. 1, in accordance with one embodiment. Such figure illustrates a typical hardware configuration of a workstation in accordance with one embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon any desired operating system. It will be appreciated that an embodiment may also be implemented on platforms and operating systems other than those mentioned. One embodiment may be written using JAVA, C, and/or C++ language, or other programming languages, along with an object oriented programming methodology. Object oriented programming (OOP) has become increasingly used to develop complex applications.

Of course, the various embodiments set forth herein may be implemented utilizing hardware, software, or any desired combination thereof. For that matter, any type of logic may be utilized which is capable of implementing the various functionality set forth herein.

Figure 3:
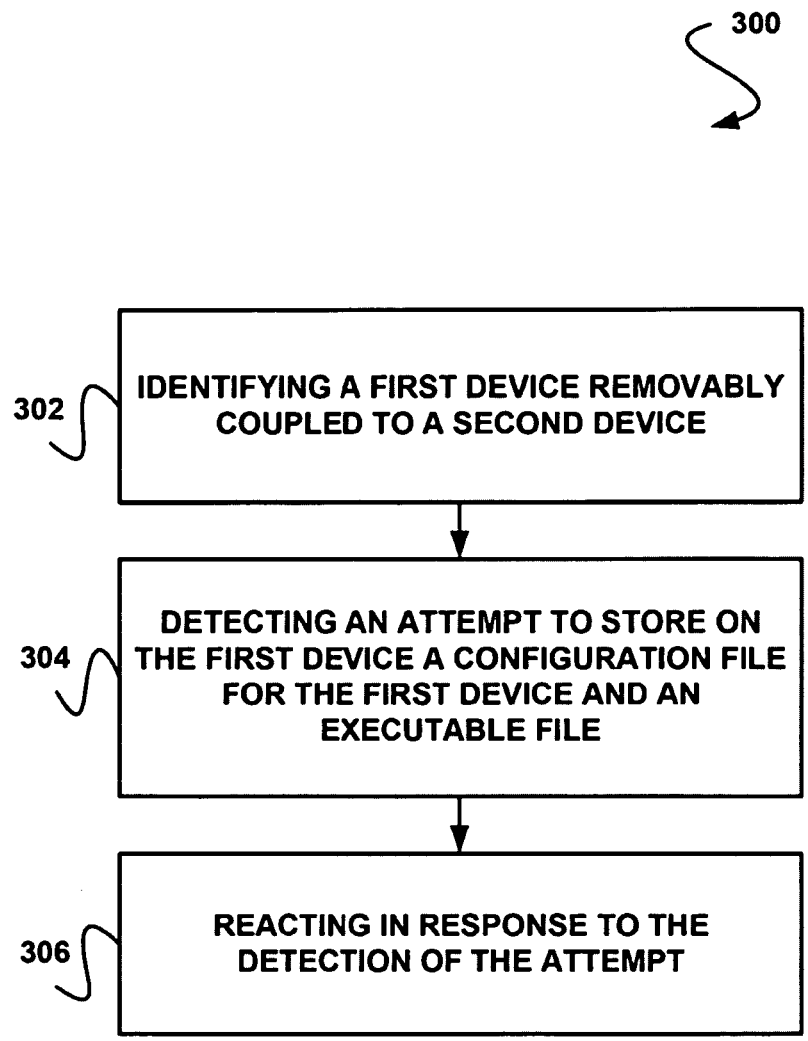
FIG. 3 shows a method for reacting in response to a detection of an attempt to store a configuration file and an executable file on a removable device, in accordance with one embodiment.

FIG. 3 shows a method 300 for reacting in response to a detection of an attempt to store a configuration file and an executable file on a removable device, in accordance with one embodiment. As an option, the method 300 may be carried out in the context of the architecture and environment of FIGS. 1 and/or 2. Of course, however, the method 300 may be carried out in any desired environment.

As shown in operation 302, a first device removably coupled to a second device is identified. In the context of the present description, the first device may include any device capable of being removably coupled to the second device and further capable of storing data thereon. In one embodiment, the first device may include a removable storage device. For example, the first device may include a portable hard drive device, a flash-based memory device, a shared network drive, a portable music player, etc.

Additionally, the second device may include any device to which the first device may be removably coupled. To this end, the second device may include an interface (e.g. port, etc.) to which the first device may be removably coupled. For example, the second device may include a workstation such as the one shown in FIG. 2.

Further in one embodiment, the first device may be removably coupled to the second device via a universal serial bus (USB) connection. In another embodiment, the first device may be removably coupled to the second device via an Institute of Electrical and Electronics Engineers (IEEE) 1394 connection. In still another embodiment, the first device may be removably coupled to the second device via a Bluetooth® wireless protocol connection. In yet another embodiment, the first device may be removably coupled to the second device via a network connection. Of course, however, the first device may be removably coupled to the second device in any manner.

Further still, in one embodiment, scanning may be performed on the second device in order to identify that the first device is removably coupled to the second device. The scanning may be continuous, periodic, on demand, etc. Optionally, the scanning may include scanning ports of the second device.

In another embodiment, an alert may be provided when the first device is removably coupled to the second device. In this way, the alert may allow identification of the first device. For example, the first device may provide an alert to the second device when it detects that it is coupled to the second device.

In yet another embodiment, monitoring may be performed by the second device for identifying that the first device is removably coupled to the second device. Just by way of example, the monitoring may include monitoring ports of the second device, etc. Of course, however, the first device may be identified as being removably coupled to the second device in any manner.

Additionally, as shown in operation 304, an attempt to store on the first device a configuration file for the first device and an executable file is detected. In the context of the present description, the configuration file may include any file capable of being utilized to configure the first device. For example, the configuration file may be used in the configuration of software or other data associated with the first device.

In one embodiment, the configuration file may include a setup information file (INF) file. For example, the configuration file may include an "autorun.inf" file associated with the Windows® operating system. As an option, the configuration file may be text-based.

In another embodiment, the configuration file may contain one or more instructions for running the executable file. For example, the configuration file may instruct an operating system (e.g. of a device on which the configuration file is stored, on a device removably coupled to the device on which the configuration file is stored, etc.) to run the executable file. Accordingly, if the configuration file and the executable file are successfully stored on the first device, an operating system of another device removably coupled to the first device may, as an option, automatically run the executable file based on the instructions included in the configuration file, upon the first device being coupled to such other device.

Further, the executable file may include any file that can be executed. In one embodiment, the executable file may include a malware file. For example, the executable file may include a virus software file, an adware file, a spyware file, etc. To this end, running the executable file from the first device via the other device, as described above, may result in malware being propagated onto such other device, in one embodiment.

Further still, the attempt to store on the first device the configuration file for the first device and the executable file may be detected based on monitoring file copy and/or create operations directed to the first device. Of course, however, the attempt may be detected in any manner.

Additionally, in one embodiment, the attempt may be performed by the second device (e.g. via a program residing on the second device, etc.). For example, the attempt may be performed by a malicious (e.g. malware) program running on the second device. In another embodiment, the malicious program may not necessarily be detected by the second device.

For example, the malicious program residing on the second device may not necessarily be detected by a security system running on the second device. More specifically, an antivirus program installed on the second device may not necessarily have a malware signature for the malicious program, and may therefore not detect the malicious program, as an option.

Further, a reaction is performed in response to the detection of the attempt. See operation 306. Such reaction may include allowing the storage of the configuration file and the executable file on the first device, as an option. As another option, the reaction may include preventing (e.g. blocking, etc.) the storage of the configuration file and the executable file on the first device. Of course, however, the reaction may include any desired reaction.

For example, in one embodiment, the reaction may include alerting (e.g. via a graphical display, etc.) a user of the second device of the attempt to store the configuration file and the executable file on the first device. In another embodiment, the user of the second device may be provided with an option to allow the storage of the configuration file and the executable file on the first device (e.g. via the alert). Thus, selection of the option to allow the attempt by the user may result in the storage of the configuration file and the executable file on the first device.

In yet another embodiment, the user of the second device may be provided with an option to prevent (e.g. block, etc.) the storage of the configuration file and the executable file on the first device (e.g. via the alert). To this end, selection of the option to prevent the attempt by the user may result in the storage of the configuration file and the executable file on the first device being prevented. In still another embodiment, the user of the second device may be provided with an option to review the configuration file and/or the executable file, including any information associated therewith (e.g. a name, location, source, content, etc. of the configuration file and/or the executable file).

More illustrative information will now be set forth regarding various optional architectures and features with which the foregoing technique may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
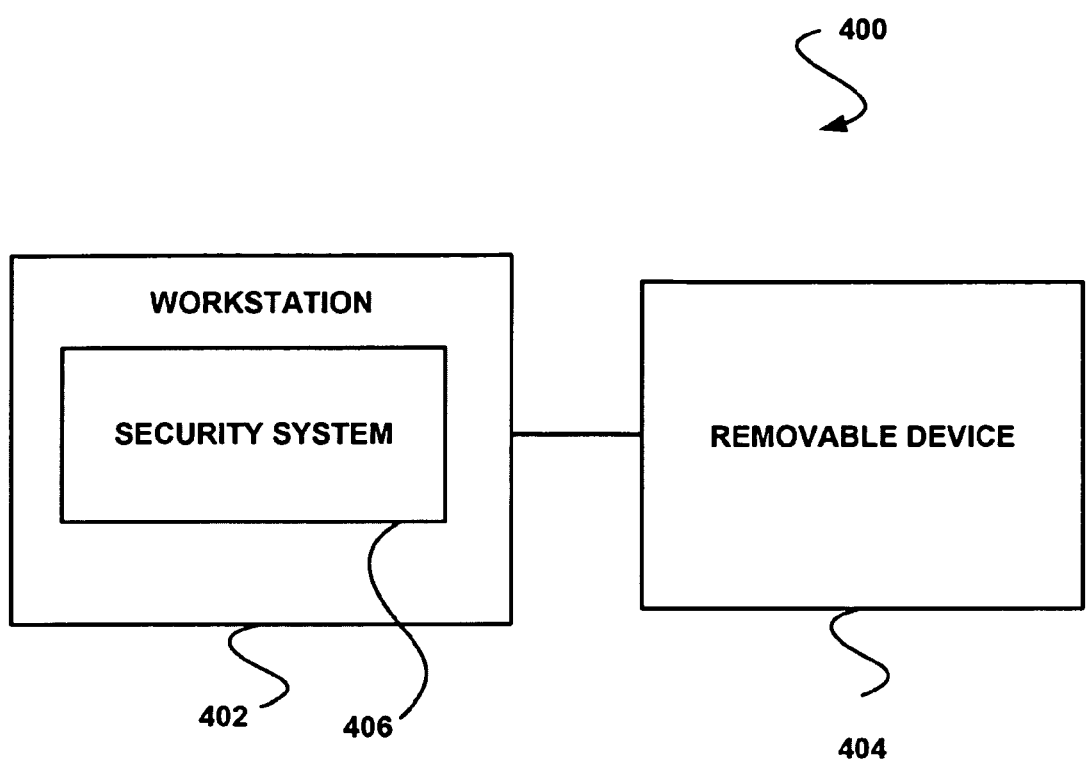
FIG. 4 shows a system for reacting in response to a detection of an attempt to store a configuration file and an executable file on a removable device, in accordance with another embodiment.

FIG. 4 shows a system 400 for reacting in response to a detection of an attempt to store a configuration file and an executable file on a removable device, in accordance with another embodiment. As an option, the system 400 may be implemented in the context of the architecture and environment of FIGS. 1-3. Of course, however, the system 400 may be carried out in any desired environment. It should also be noted that the aforementioned definitions may apply during the present description.

As shown, a removable device 404 is removably coupled to a workstation 402. In one embodiment, the removable device 404 may include the first device described in FIG. 3. For example, the removable device 404 may include a removable flash-based memory device, a shared network drive, etc. In another embodiment, the workstation 402 may include the second device described in FIG. 3. For example, the workstation 402 may include a workstation such as the one shown in FIG. 2, etc.

In one embodiment, a user may connect the removable device 404 to the workstation 402, such that data may be transferred between the removable device 404 and the workstation 402. As an option, the removable device 404 may be connected to the workstation 402 via a port of the workstation 402 (e.g. USB port, serial port, etc.). In another embodiment, the removable device 404 may be connected to the workstation 402 via a network.

Additionally, the workstation 402 contains a security system 406. The security system 406 may include any system utilized to provide security to the workstation 402. In one embodiment, the security system 406 may include one or more software elements. For example, the security system 406 may include antivirus software.

Further the security system 406 may identify the removable device 404 upon the removable device 404 being removably coupled to the workstation 402. For example, the security system 406 may identify the removable device 404 by monitoring an interface of the workstation 402 to which the removable device 404 is capable of being connected. Of course, however, any application of the workstation 402 may be utilized for identifying a connection between the removable device 404 and the workstation 402.

Moreover, in one embodiment, the security system 406 may monitor the connection between the workstation 402 and the removable device 404. In this way, the security system 406 may optionally detect an attempt by the workstation 402 to store a configuration file for the removable device 404 and an executable file on the removable device 404. For example, the security system 406 may detect any attempt to store data on the removable device 404, and may determine for each attempt whether the data attempted to be stored on the removable device 404 includes a configuration file for the removable device 404 and an executable file.

Accordingly, the workstation 402 may react to the detection of the attempt to store the configuration file for the removable device 404 and the executable file on the removable device 404. Such reaction may include allowing or preventing the storage of the configuration file for the removable device 404 and the executable file on the removable device 404. In one embodiment, the security system 406 may perform the reaction.

In another embodiment, a program on the workstation 402 in communication with the security system 406 may be notified of the attempt to store the configuration file for the removable device 404 and the executable file on the removable device 404. For example, a plug-in to the security system 406 may be installed on the workstation 402, and the plug-in may be notified by the security system 406 of the attempt to store the configuration file for the removable device 404 and the executable file on the removable device 404. In another embodiment, the program may react in response to the notification of the attempt to store the configuration file for the removable device 404 and the executable file on the removable device 404.

Figure 5:
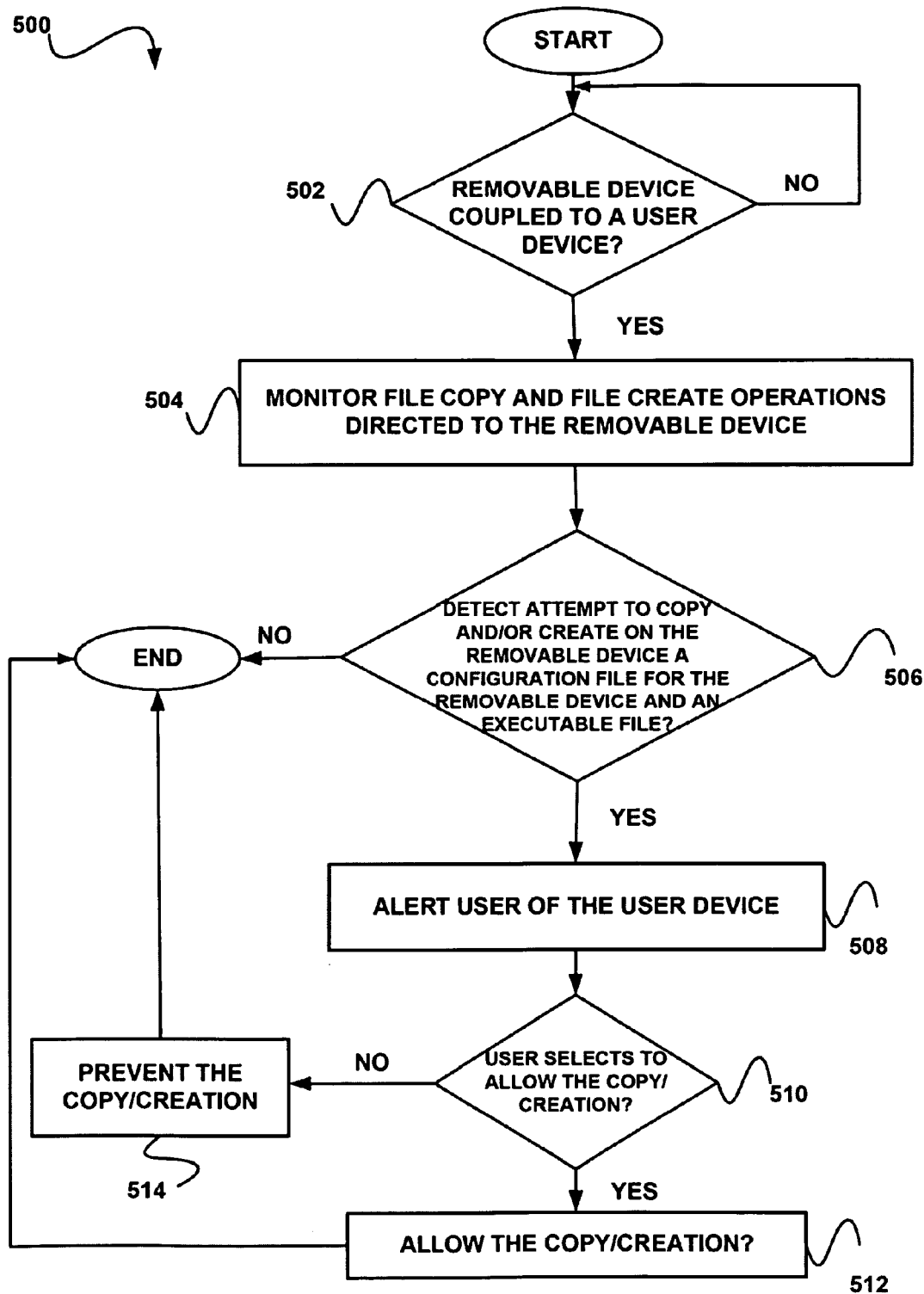
FIG. 5 shows a method for allowing or preventing an attempt to copy and/or create on a removable device a configuration file for the removable device and an executable file, in accordance with yet another embodiment.

FIG. 5 shows a method 500 for allowing or preventing an attempt to copy and/or create on a removable device a configuration file for the removable device and an executable file, in accordance with yet another embodiment. As an option, the method 500 may be carried out in the context of the architecture and environment of FIGS. 1-4. For example, the method 500 may be carried out utilizing the workstation 402 of FIG. 4. Of course, however, the method 500 may be carried out in any desired environment. It should also be noted that the aforementioned definitions may apply during the present description.

As shown in decision 502, it is determined whether a removable device is coupled to a user device. In the context of the current embodiment, the user device may include any device to which a removable device can be removably coupled. For example, the user device may include the workstation 402 of FIG. 4, the second device of FIG. 3, etc. Additionally the removable device may optionally include the removable device 404 of FIG. 4, the first device of FIG. 3, etc.

In one embodiment, the determination may be based on monitoring active connections of the user device. For example, connections made to a universal serial bus (USB) port of the user device may be monitored. In another embodiment, the determination may be based on receiving a signal or other indicator from the user device and/or the removable device when coupling has occurred. If in decision 502 it is determined that the removable device is not coupled to the user device, then the method 500 continues to wait for a removable device to be coupled to the user device.

If in decision 502 it is determined that the removable device is coupled to the user device, then in operation 504 file copy and file create operations directed to the removable device are monitored. In the context of the current embodiment, the file copy operation may include any operation that copies an existing file to the removable device. For example, the file copy operation may include the copying of a file from the user device to the removable device. Additionally, the file create operation may include any operation that creates a new file on the removable device.

In one embodiment, copy and/or create operations directed towards a particular connection associated with the removable device may be monitored. For example, read and/or write operations directed towards a USB connection associated with the removable device may be monitored. In another embodiment, the monitoring may include the monitoring of all read, write, and copy operations performed by the user device. In yet another embodiment, the monitoring may be constantly performed.

In yet a further embodiment, one or more programs running on the user device may perform the monitoring. For example, a security system (e.g. antivirus software) installed on the user device may perform the monitoring. In still another embodiment, a plug-in installed on the user device may perform the monitoring.

Additionally, in decision 506 it is determined whether an attempt to copy and/or create on the removable device a configuration file for the removable device and an executable file is detected. In one embodiment, the determination may include examining one or more file names associated with file copy and file create operations directed to the removable device that are identified via the monitoring. For example, it may be determined whether an attempt has been made to copy and/or create an "autorun.inf" file and an executable file on the removable device.

In another embodiment, the plug-in may perform the determination. For example, the plug-in may be in communication with the security system which may monitor copy and/or create operations directed to the removable device. If the security system detects a file copy and/or a file create operation directed to the removable device, the plug-in may be alerted and may then perform the determination. In another example, the plug-in may directly monitor copy and/or create operations directed to the removable device and may perform the determination as a result of the monitoring.

If the attempt to copy and/or create on the removable device a configuration file for the removable device and an executable file is not detected in decision 506, the method 500 terminates. If, however, the attempt to copy and/or create on the removable device a configuration file for the removable device and an executable file is detected in decision 506, then in operation 508 a user of the user device is alerted. In the context of the current embodiment, the user of the user device may include any individual involved with the current operation of the user device. For example, the user may be an individual who is logged in to the user device.

Additionally, in one embodiment, alerting the user may include displaying an alert to the user. For example, a pop-up message may be presented to the user. In another embodiment, alerting the user may include sounding an audible alert. In yet another embodiment, alerting the user may include providing the user with one or more actions to take in association with the attempt to copy and/or create on the removable device the configuration file for the removable device and the executable file. For example, the user may be provided with the ability to allow or prevent the copy and/or creation on the removable device of the configuration file for the removable device and the executable file.

Further, in another embodiment, alerting the user may include providing the user with the ability to review the configuration file and/or the executable file. For example, the user may be provided with the ability to view the file names of the configuration file and/or the executable file, open and view all or part of the text of the configuration file and/or the executable file, etc.

Further still, in decision 510 it is determined whether the user has selected to allow the copy and/or creation on the removable device of the configuration file for the removable device and the executable file. In one embodiment, the determination may be based on receipt of a selection of an action from the user. For example, the user may select an icon that is displayed within the alert that is associated with an option to allow the copy and/or creation on the removable device of the configuration file for the removable device and the executable file, or the user may select an icon that is displayed within the alert that is associated with an option to prevent the copy and/or creation on the removable device of the configuration file for the removable device and the executable file.

If in decision 510 it is determined that the user has selected to allow the copy and/or creation on the removable device of the configuration file for the removable device and the executable file, then the copy and/or creation on the removable device of the configuration file for the removable device and the executable file is allowed. See operation 512. In one embodiment, allowing the copy and/or creation on the removable device of the configuration file for the removable device and the executable file may include allowing storage on the removable device of the configuration file for the removable device and the executable file. Additionally, after the copy and/or creation on the removable device of the configuration file for the removable device and the executable file is allowed in operation 512, the method 500 terminates.

If in decision 510 it is determined that the user has selected not to allow the copy and/or creation on the removable device of the configuration file for the removable device and the executable file, then in operation 514 the copy and/or creation on the removable device of the configuration file for the removable device and the executable file is prevented. In one embodiment, preventing the copy and/or creation on the removable device of the configuration file for the removable device and the executable file may include preventing storage on the removable device of the configuration file for the removable device and the executable file. In another embodiment, preventing the copy and/or creation on the removable device of the configuration file for the removable device and the executable file may include flagging an application from which the attempt to copy and/or create on the removable device the configuration file for the removable device and the executable file originated. For example, the application that attempted the copying and/or creating on the removable device of the configuration file for the removable device and the executable file may be flagged for later review by the security system.

In yet another embodiment, preventing the copy and/or creation on the removable device of the configuration file for the removable device and the executable file may include deleting one or more files. For example, the file that attempted the copying and/or creating on the removable device of the configuration file for the removable device and the executable file may be deleted by the security system. In another example, preventing the attempt may include deleting the configuration file for the removable device and/or the executable file. Additionally, after the attempt is prevented in operation 514, the method 500 terminates.

In this way, the removable device coupled to the user device may be protected against the transfer of malicious configuration files and/or malicious executable files to such removable device by a malware program of the user device. Such protection may optionally be accomplished even if the malware program of the user device is not detected by the security system of the user device.

Additionally, a user device infected with a malware program may be prevented from spreading malicious files to other devices via the removable device, thereby preventing an outbreak of malware from the infected user device. Further, the user may be provided with an option to inspect one or more malicious executable files of the infected user device.

Figure 6:
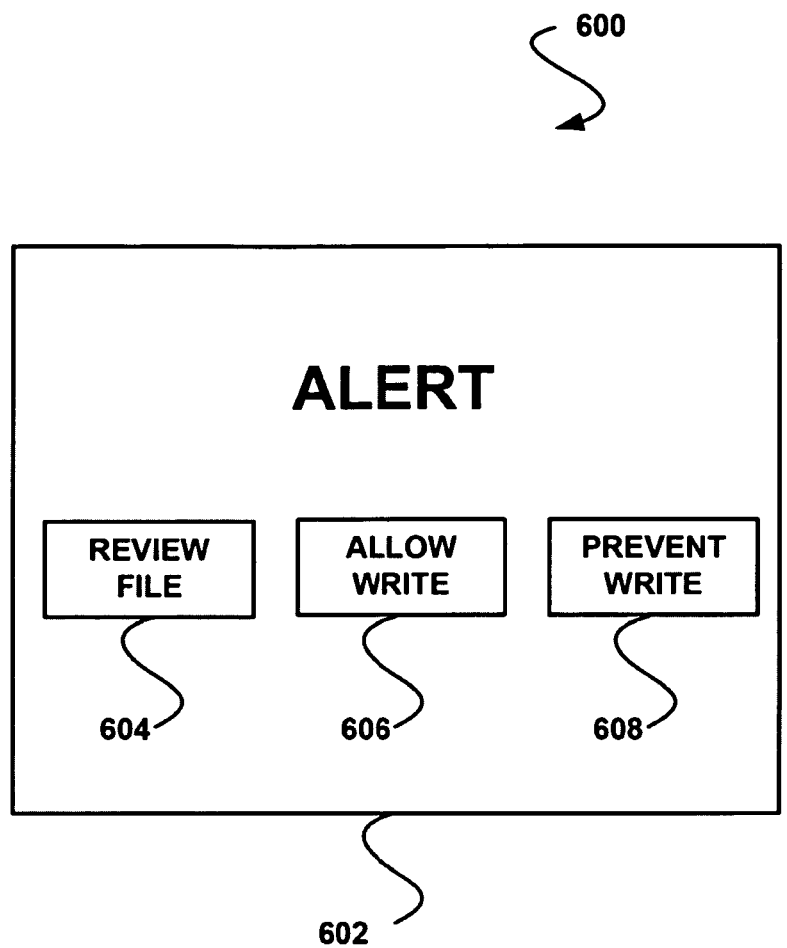
FIG. 6 shows an exemplary user alert, in accordance with still yet another embodiment.

FIG. 6 shows an exemplary user alert 600, in accordance with still yet another embodiment. As an option, the user alert 600 may be implemented in the context of the architecture and environment of FIGS. 1-5. Of course, however, the user alert 600 may be implemented in any desired environment. Again, it should be noted that the aforementioned definitions may apply during the present description.

As shown, the exemplary user alert 600 includes a visual alert 602. In one embodiment, the visual alert 602 may be displayed to a user upon detecting an attempt to store a configuration file for a removable device and an executable file on such removable device. For example, the visual alert 602 may be displayed as a pop-up message upon detecting an attempt to copy and/or create on the removable device the configuration file for the removable device and the executable file.

Additionally, the visual alert 602 includes a review file option 604. In one embodiment, selecting the review file option 604 may allow a user to review all or part of the configuration file for the removable device and the executable file that is attempted to be stored on the removable device. For example, selecting the review file option 604 may allow a user to open a configuration file such as an INF file in order to identify whether the executable file is instructed to be executed via the configuration file.

Just by way of example, an attempt may be made to store a file named "autorun.inf" on the removable device which contains the instruction "open=program.exe" under an "[autorun]" section. By selecting the review file option 604, a user may be able to view the text of the "autorun.inf" in order to identify that "program.exe" is instructed to be executed via "autorun.inf" In this way, the user may view an executable file that is to be executed by the configuration file and react accordingly.

Further, the visual alert 602 includes an allow write option 606. In one embodiment, selecting the allow write option 606 may allow the writing of the configuration file for the removable device and the executable file to the removable device. As a result, the user may allow the configuration file for the removable device and the executable file to be written to the removable device if the user has determined such to be safe.

Further still, the visual alert 602 includes a prevent write option 608. In one embodiment, selecting the prevent write option 608 may prevent the writing of the configuration file for the removable device and the executable file to the removable device. In this way, the prevent write option 608 may prevent the configuration file for the removable device and the executable file from being written to the removable device if the user determines that such includes harmful or undesired data.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory tangible computer readable medium comprising one or more instructions that when executed on a processor configure the processor to performing operations for protecting against the transfer of malicious files to a removable device and the spread of the malicious files to other devices via the removable device, the operations comprising:

identifying the removable device coupled to a second device, comprises an alert provided by the first device, wherein the first device provides an alert to the second device when it detects that it is coupled to the second device, wherein the removable device removably couples to the second device using a universal serial bus (USB) port;

monitoring file copy operations directed toward the removable device; detecting an attempt made by a malicious program residing on the second device to transfer a configuration file and an executable file onto the removable device based on the monitoring of the file copy operations directed towards the removable device over the USB port, wherein configuration file is setup information file (INF) file, wherein the malicious program is already present on the second device, before the transfer and is not previously detected by an antivirus program of a security system provided in the second device as malicious due to the second device not having a malware signature for the malicious program, and wherein the security system is configured to scan a plurality of ports, including the USB port, of the second device in order to identify the attempt; and reacting, by the security system, in response to the detection of the attempt by: providing a user of the second device with an option to prevent storage of the configuration file and the executable file on the removable device by deleting the configuration file and the executable file; and in response to the user selecting the option, flagging the malicious program residing on the second device from which the attempt originated for review by the security system;

reacting includes alerting the user of the second device of the attempt to store the configuration file and executable file, wherein an alerting the user includes providing the user with the option to review the configuration file and the executable file names, and open and view all or part of the configuration file and executable file text.

2. The non-transitory tangible computer readable medium of claim 1, wherein the first device is a flash-based memory device.

3. The non-transitory tangible computer readable medium of claim 1, wherein the configuration file for the first device instructs an operating system to run the executable file.

4. The non-transitory tangible computer readable medium of claim 1, wherein the reacting includes providing the user of the second device with an option to allow storage of the configuration file for the first device and the executable file on the first device.

5. The non-transitory tangible computer readable medium of claim 1, wherein the operations further comprises monitoring file copy and file create operations directed to the removable device.

6. A method for protecting against the transfer of malicious files to a removable device and the spread of the malicious files to files to other devices via the removable device, comprising:

identifying the removable device coupled to a second device via an alert provided by the removable device to the second device, wherein the removable device removably couples to the second device using a universal serial bus (USB) port;

monitoring file copy operations directed toward the removable device;

detecting an attempt made by a malicious program residing on the second device to transfer a configuration file and an executable file onto the removable device based on the monitoring of the file copy operations directed towards the removable device over the USB port, wherein the configuration file is a setup information (INF) file, the malicious program is already present on the second device before the transfer and is not previously detected by an antivirus program of a security system provided in the second device as malicious due to the second device not having a malware signature for the malicious program, and the security system is configured to scan a plurality of ports, including the USB port, of the second device in order to identify the attempt; and reacting, by the security system, in response to the detection of the attempt by:

providing a user of the second device with an option to prevent storage of the configuration file and the executable file on the removable device by deleting the configuration file and the executable file;

providing the user of the second device with an option to review the names and text of the configuration file and/or the executable file; and in response to the user selecting the option to prevent storage of the configuration file and executable file, flagging the malicious program residing on the second device from which the attempt originated for review by the security system.

7. A system for protecting against the transfer of malicious files to a removable device and the spread of the malicious files to other devices via the removable device, comprising:

a processor, wherein the system is configured for:

identifying the removable device coupled to a second device via an alert provided by the removable device to the second device, wherein the removable device removably couples to the second device using a universal serial bus (USB) port;

monitoring file copy operations directed toward the removable device;

detecting an attempt made by a malicious program residing on the second device to transfer a configuration file and an executable file onto the removable device based on the monitoring of the file copy operations directed towards the removable device over the USB port, wherein the configuration file is a setup information (INF) file, the malicious program is already present on the second device before the transfer and is not previously detected by an antivirus program of a security system provided in the second device as malicious due to the second device not having a malware signature for the malicious program, and the security system is configured to scan a plurality of ports, including the USB port, of the second device in order to identify the attempt; and reacting, by the security system, in response to the detection of the attempt by:

providing a user of the second device with an option to prevent storage of the configuration file and the executable file on the removable device by deleting the configuration file and the executable file;

providing the user of the second device with an option to review the names and text of the configuration file and/or the executable file; and in response to the user selecting the option to prevent storage of the configuration file and executable file, flagging the malicious program residing on the second device from which the attempt originated for review by the security system.

8. The system of claim 7, wherein the processor is coupled to memory via a bus.

9. The non-transitory tangible computer readable medium of claim 1, wherein the configuration file includes an autorun.inf file.

10. The non-transitory tangible computer readable medium of claim 1, wherein reacting includes providing the user of the second device with a review file option that allows the user to view the text of the configuration file.

11. The method of claim 6, wherein the configuration file includes an autorun.inf file.

12. The method of claim 6, wherein reacting includes providing the user of the second device with a review file option that allows the user to view the text of the configuration file.

13. The system of claim 7, wherein the configuration file includes an autorun.inf file.

14. The system of claim 7, wherein reacting includes providing the user of the second device with a review file option that allows the user to view the text of the configuration file.

* * * * *